US011940106B2

(12) United States Patent
Oliver et al.

(10) Patent No.: US 11,940,106 B2
(45) Date of Patent: Mar. 26, 2024

(54) LOW PROFILE MODULAR LIGHTING DEVICE WITH FLEXIBLE INSTALLATION

(71) Applicant: RAB Lighting Inc., New York, NY (US)

(72) Inventors: Jason Lawrence Oliver, Rye, NY (US); Sam Shifron, Del Mar, CA (US); Cameron Nielsen, Orem, UT (US); Glen Oross, Heber City, UT (US)

(73) Assignee: RAB Lighting Inc., New York, NY (US)

(*) Notice: Subject to any disclaimer, the term of this patent is extended or adjusted under 35 U.S.C. 154(b) by 0 days.

(21) Appl. No.: 17/823,829

(22) Filed: Aug. 31, 2022

(65) Prior Publication Data

US 2024/0068630 A1 Feb. 29, 2024

(51) Int. Cl.

*F21S 2/00* (2016.01)
*F21S 8/04* (2006.01)
*F21V 23/06* (2006.01)

(52) U.S. Cl.

CPC ................. *F21S 2/005* (2013.01); *F21S 8/04* (2013.01); *F21V 23/06* (2013.01)

(58) Field of Classification Search

CPC .............. F21S 2/005; F21S 8/04; F21V 23/06
See application file for complete search history.

(56) References Cited

U.S. PATENT DOCUMENTS 8,049,639 B2 11/2011 Sibalich et al.
9,163,817 B2 10/2015 Huang
9,657,925 B2 5/2017 Feit et al.
9,772,099 B2 9/2017 Boomgaarden et al.
9,854,653 B1 * 12/2017 Ackmann ............ H05B 47/115
9,903,569 B2 2/2018 O'Brien et al.
9,933,124 B2 4/2018 Ticktin et al.
10,557,619 B2 2/2020 Behnke et al.

(Continued)

FOREIGN PATENT DOCUMENTS

WO 2001024335 A1 4/2001

OTHER PUBLICATIONS

Leviton, Infrared Ceiling Mounted Occupancy Sensor, Web page: <https://images.homedepot-static.com/catalog/pdfImages/39/390cfccd-6325-441d-a949-e42571e84a4e.pdf>, retrieved May 12, 2022, pp. 1-2.

(Continued)

*Primary Examiner* — Tsion Tumebo
(74) *Attorney, Agent, or Firm* — Innovation Law Office; Dennis S. Schell

(57) ABSTRACT

A low-profile modular lighting device with flexible installation mounting options includes a lower housing, a circuit board supported by the lower housing and having electronic devices mounted thereto, and a plurality of upper housings each configured to releasably couple to the lower housing. The electronic devices of the circuit board extend within the space defined by an interior surface and upper edge of the lower housing and within the space defined by an interior surface and lower edge of each of the plurality of upper housings when coupled to the lower housing. Each of the plurality of upper housings provide a different mounting configuration for the modular lighting device. The modular lighting device may include one or more of a motion sensor, a light sensor, and a wireless transceiver for communication with a wireless lighting system.

22 Claims, 6 Drawing Sheets

(56) References Cited

U.S. PATENT DOCUMENTS

| | | | | |
|---|---|---|---|---|
| 10,670,203 | B1 | 6/2020 | Glazer et al. | |
| 11,258,932 | B1 * | 2/2022 | Tylicki | H02G 3/16 |
| 2010/0271802 | A1 * | 10/2010 | Recker | H05B 45/12<br>362/20 |
| 2012/0086345 | A1 * | 4/2012 | Tran | F24F 11/30<br>315/158 |
| 2015/0319828 | A1 * | 11/2015 | Moon | H05B 45/12<br>315/158 |
| 2015/0338077 | A1 * | 11/2015 | Johnson | F21V 23/0442<br>362/249.02 |
| 2016/0084491 | A1 * | 3/2016 | Boomgaarden | F21V 29/508<br>362/267 |
| 2020/0248898 | A1 * | 8/2020 | Chen | F21V 23/0464 |
| 2021/0266428 | A1 * | 8/2021 | Dintner | F21V 33/0076 |
| 2022/0082221 | A1 * | 3/2022 | Paredes | F21S 8/033 |

OTHER PUBLICATIONS

Westgate Mfg., Inc., LED Universal Vapor Lights, Oct. 31, 2017, 1 page.

Rab Lighting Inc., LCSENSE/W Technical Specifications, 2023, pp. 1-2, New York, NY.

* cited by examiner

LOW PROFILE MODULAR LIGHTING DEVICE WITH FLEXIBLE INSTALLATION

TECHNICAL FIELD

Embodiments of this disclosure relate generally to lighting system devices, and more particularly to mounting features of lighting system devices.

BACKGROUND

Traditional lighting system devices are generally designed for and limited to a specific type of installation in mind, for example, for remodeling, new construction, recessed mount, flush mount, track mount, pendant mount, etc.

Such devices, whether a lighting fixture or an accessory, such as a lighting system sensor, lack flexibility in installation mounting options and are often physically and aesthetically intrusive into a room upon installation. Certain features of the present disclosure address these and other problems and provide other important advantages.

SUMMARY

The embodiments of the present disclosure include a low-profile modular lighting device with flexible installation mounting options includes a lower housing, a circuit board supported by the lower housing and having electronic devices mounted thereto, and a plurality of upper housings each configured to couple to the lower housing. The electronic devices of the circuit board extend within the space defined by an interior surface and upper edge of the lower housing and within the space defined by an interior surface and lower edge of each of the plurality of upper housings when coupled to the lower housing. Each of the plurality of upper housings provide a different mounting configuration for the modular lighting device. The modular lighting device may include one or more of a motion sensor, a light sensor, and a wireless transceiver for communication with a wireless lighting system.

According to an illustrative embodiment, a modular lighting device, comprises a lower housing; a circuit board supported by the lower housing and having electronic devices mounted thereto; and a plurality of upper housings each configured to releasably couple to the lower housing, a selected one of the plurality of upper housings coupled to the lower housing; and wherein the electronic devices of the circuit board extend within the space defined by an interior surface and upper edge of the lower housing and within the space defined by an interior surface and lower edge of each of the plurality of upper housings when coupled to the lower housing; and each of the plurality of upper housings provide a different mounting configuration for the modular lighting device.

The circuit board may be located within the space defined by the interior surface and lower edge of the upper housing when coupled to the lower housing, thereby minimizing a height of the lower housing. The electronic devices may be mounted to an upper and a lower side of the circuit board. The circuit board and electronic devices mounted thereto may be enclosed by the lower housing and each of the plurality of upper housings when coupled to the lower housing.

The modular lighting device may further comprise an annular cover releasably coupled with a bottom side of the lower housing, the annular cover spanning and concealing fasteners for at least one of mounting the modular lighting device and attaching the lower housing to one of the plurality of upper housings. The selected one of the plurality of upper housings may be configured to enable mounting within a recess defined in a ceiling. The selected one of the plurality of upper housings may be sized to be received within the recess; and the lower housing may be sized to cover an area of the ceiling larger than the recess, thereby concealing the recess upon mounting the modular lighting device to the ceiling recess.

The selected one of the plurality of upper housings may optionally include a pair of spring mounts for retaining the selected one of the plurality of upper housings within the recess. The selected one of the plurality of upper housings may be configured to enable mounting upon a flat surface of a ceiling. The selected one of the plurality of upper housings may include a mounting arm terminating in a threaded conduit.

The electronic devices may include a motion sensor. The modular lighting device may further comprise a lens coupled to a central portion of the lower housing, the lens concealing the motion sensor. The electronic devices may include a light sensor. The electronic devices may include a wireless transceiver for communication with a wireless lighting control system.

At least another one of the plurality of upper housings may be sized to couple with the lower housing and enclose the selected one of the plurality of upper housings coupled to the lower housing.

Another illustrative embodiment of the modular lighting device, comprises a lower housing; a circuit board supported by the lower housing and having electronic devices mounted thereto; and a plurality of upper housings each configured to be coupled to the lower housing, a selected one of the plurality of upper housings coupled to the lower housing; and wherein the electronic devices of the circuit board span vertically from below an upper edge of the lower housing to above a lower edge of each of the plurality of upper housings when coupled to the lower housing, thereby the circuit board and electronic devices extend within a space defined by both the lower housing and each of the plurality of upper housings when coupled to the lower housing; and each of the plurality of upper housings provide a different mounting configuration for the modular lighting device.

The selected one of the plurality of upper housings may be configured to enable mounting within a recess defined in a ceiling and may be sized to be received within the recess; and the lower housing may be sized to cover an area of the ceiling larger than the recess, thereby concealing the recess and the selected one of the plurality of upper housings upon mounting the modular lighting device to the ceiling recess.

The selected one of the plurality of upper housings may include a pair of spring mounts for retaining the one of the plurality of upper housings within the recess. The selected one of the plurality of upper housings may be configured to enable mounting the upper housing upon a flat surface of a ceiling. The selected one of the plurality of upper housings may include a threaded conduit end.

The electronic devices of the circuit board may include at least a motion sensor; a light sensor; and a wireless transceiver for communication with a wireless lighting control system.

Yet another illustrative embodiment of a modular lighting device, comprises a lower housing; a circuit board supported by the lower housing and having electronic devices mounted thereto; and a plurality of upper housings each configured to couple to the lower housing; and wherein the electronic devices of the circuit board extend within the space defined by an interior surface and upper edge of the lower housing and within the space defined by an interior surface and lower edge of each of the plurality of upper housings when coupled to the lower housing; each of the plurality of upper housings provide a different mounting configuration for the modular lighting device; a first one of the plurality of upper housings is sized to be received within a recess enabling an upper edge of the lower housing to be mounted against ceiling; a second one of the plurality of upper housings is configured to enable mounting the upper housing upon a flat surface of a ceiling; and a third one of the plurality of upper housings includes a threaded conduit end.

This summary is provided to introduce a selection of the concepts that are described in further detail in the detailed description and drawings contained herein. This summary is not intended to identify any primary or essential features of the subject matter. Some or all of the described features may be present in the corresponding independent or dependent claims but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

Figure 1:
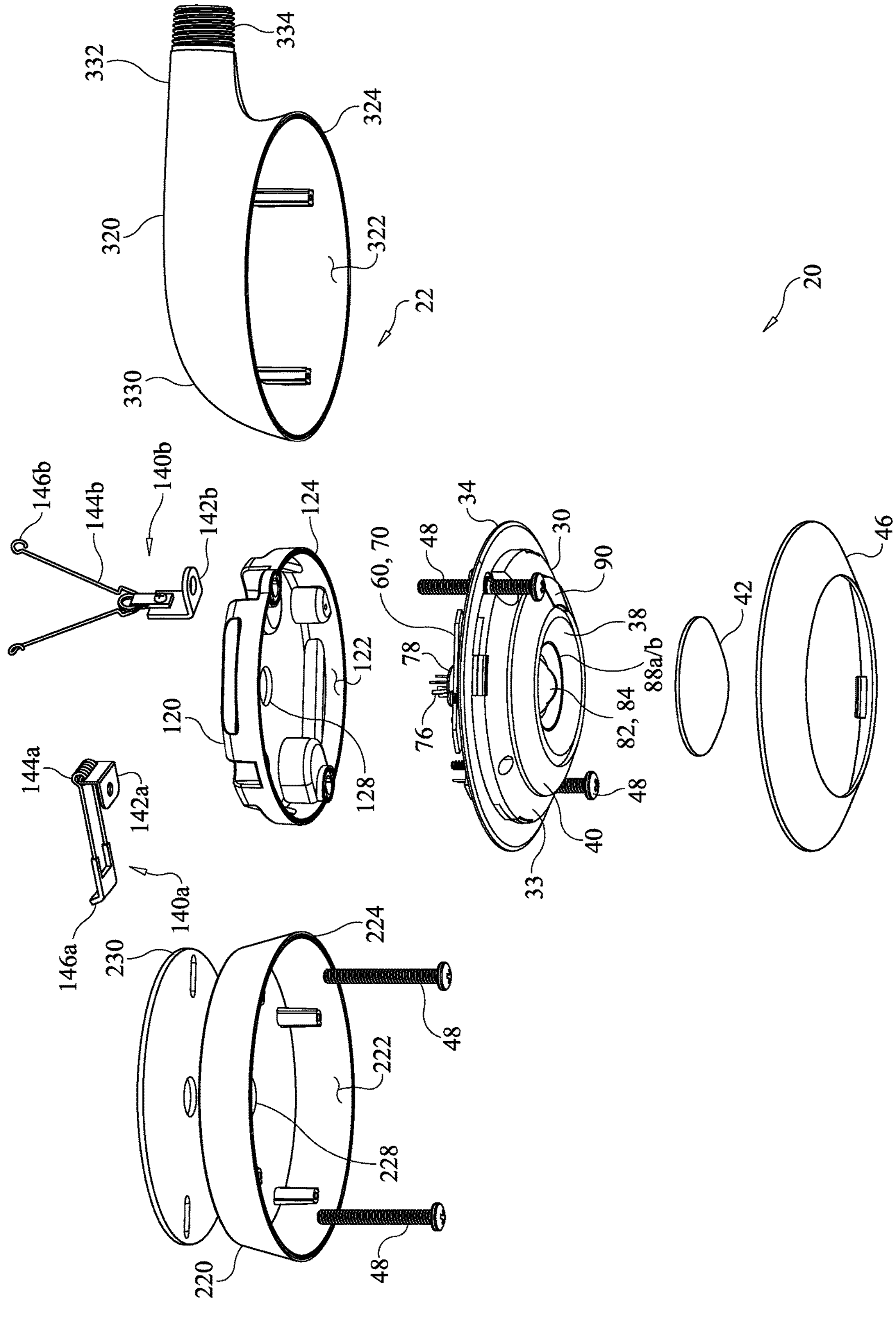
FIG. 1 is an exploded bottom perspective view of an illustrative embodiment of a lighting system device showing a plurality of upper housings according to the present disclosure.

For the purposes of promoting an understanding of the principles of the disclosure, reference will now be made to one or more embodiments, which may or may not be illustrated in the drawings, and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to benefits or advantages provided by some embodiments, other embodiments may not include those same benefits or advantages, or may include different benefits or advantages. Any benefits or advantages described herein are not to be construed as limiting to any of the claims.

The embodiments of the present disclosure include a low-profile modular lighting device 20 with flexible installation options includes a lower housing 30, a circuit board 60 with electronic devices 70 supported by the lower housing 30, and a plurality of upper housings 22, 120, 220, 320, each configured to couple to the lower housing 30. The electronic devices 70 of the circuit board 60 extend within a space defined by an interior surface 32 and upper edge 34 of the lower housing 30 and within a space defined by an interior surface 122, 222, 322 and lower edge 124, 224, 324 of each of the plurality of upper housings 22, 120, 220, 320 when coupled to the lower housing. Each of the plurality of upper housings 22, 120, 220, 320 provide a different mounting configuration for the installation of the modular lighting device 20. The electronic devices 70 of the modular lighting device 20 may include one or more of a motion sensor 82, a light sensor **86*a*, a user interface 90, and a wireless transceiver 80** for communication with a wireless lighting system.

Advantageously, utilizing space within the lower housing 30 for locating at least a portion of the electrical devices 70 aids in maximizing performance of devices such as the motion sensor 82, light sensor **86*a*, user interface 90, and wireless transceiver 80. User interface 90 may be for example, one or more switches for selecting and/or one or more indicators for indicating a mode of operation of the modular lighting device 20, including, for example, light emitter 86*b* and light guide 88*b*. Utilizing space within the upper housing 22 for at least a portion of these electrical devices 70 aids in minimizing the height 36 of the lower housing 30, thereby providing a lower-profile protrusion below a ceiling surface 10, which is generally aesthetically and architecturally desirable. For example, see the modular lighting device 20 as shown installed in FIG. 5 with the first upper housing 120 selected to be coupled to the lower housing 30 and only the lower housing protruding below the ceiling surface 10**.

Figure 3:
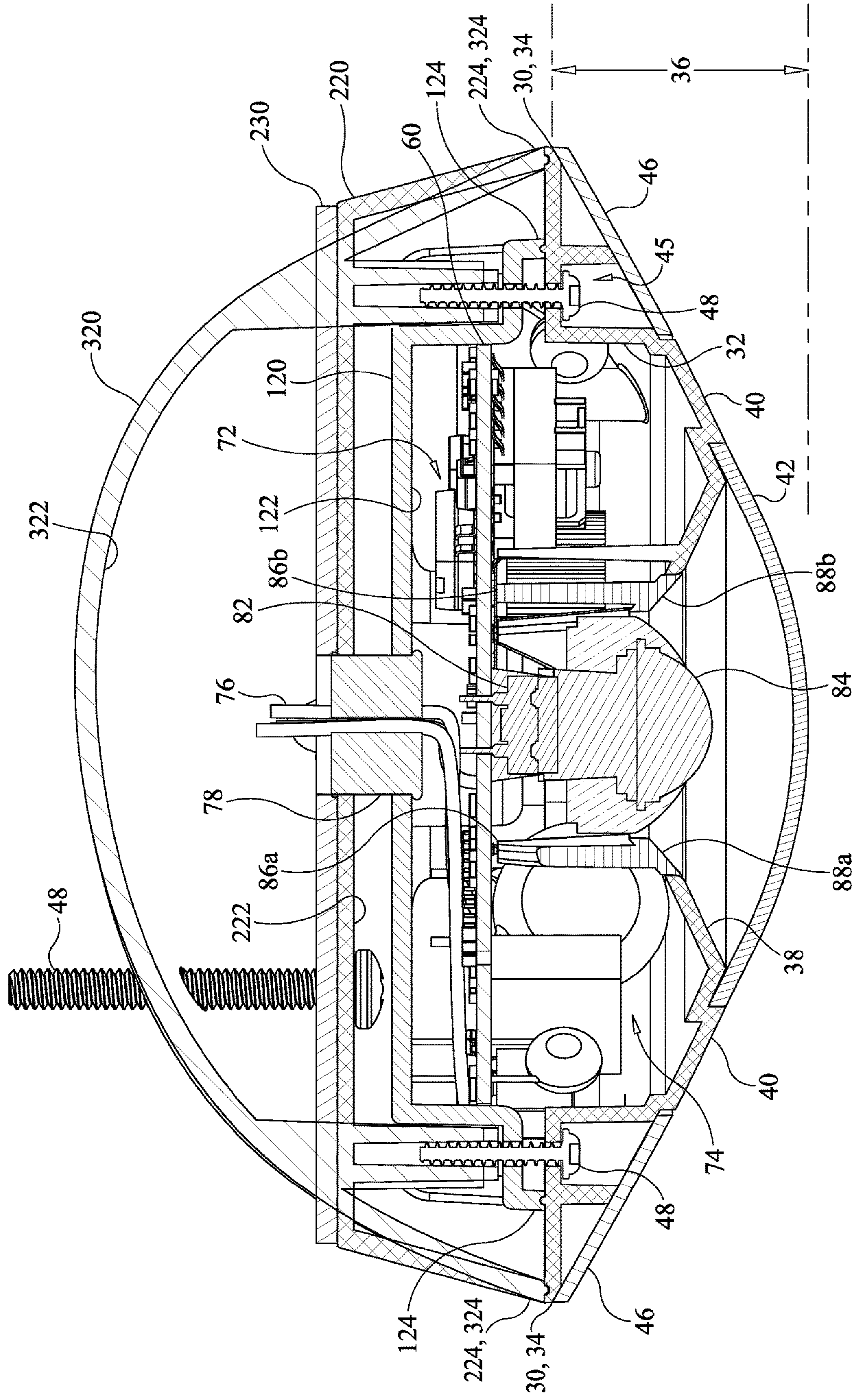
FIG. 3 is a cross-sectional assembled side view of the lighting system device of FIG. 2 showing the plurality of upper housings overlappingly coupled with the lower housing.

Referring to FIGS. 1 and 3, the lower housing 30 includes an interior surface 32 and an upper edge 34. As can be noted in FIG. 3, in the illustrative embodiment the upper edge 34 extends horizontally to form a flange. Because the largest diameter of the upper edge 34 of the lower housing 30 can be greater than a recess 12, formed in the ceiling surface 10 and into which the first upper housing 120 is received, the flange portion of the upper edge 34 advantageously overlaps with the ceiling surface 10 thereby concealing the recess 12 and first upper housing 120 once installed. In other embodiments of the modular lighting device 20, the upper edge 34 of the lower housing 30 may define the end of a generally vertical wall, rather than a horizontally extending flat surface forming a flange as depicted in the illustrative embodiment.

Figure 2:
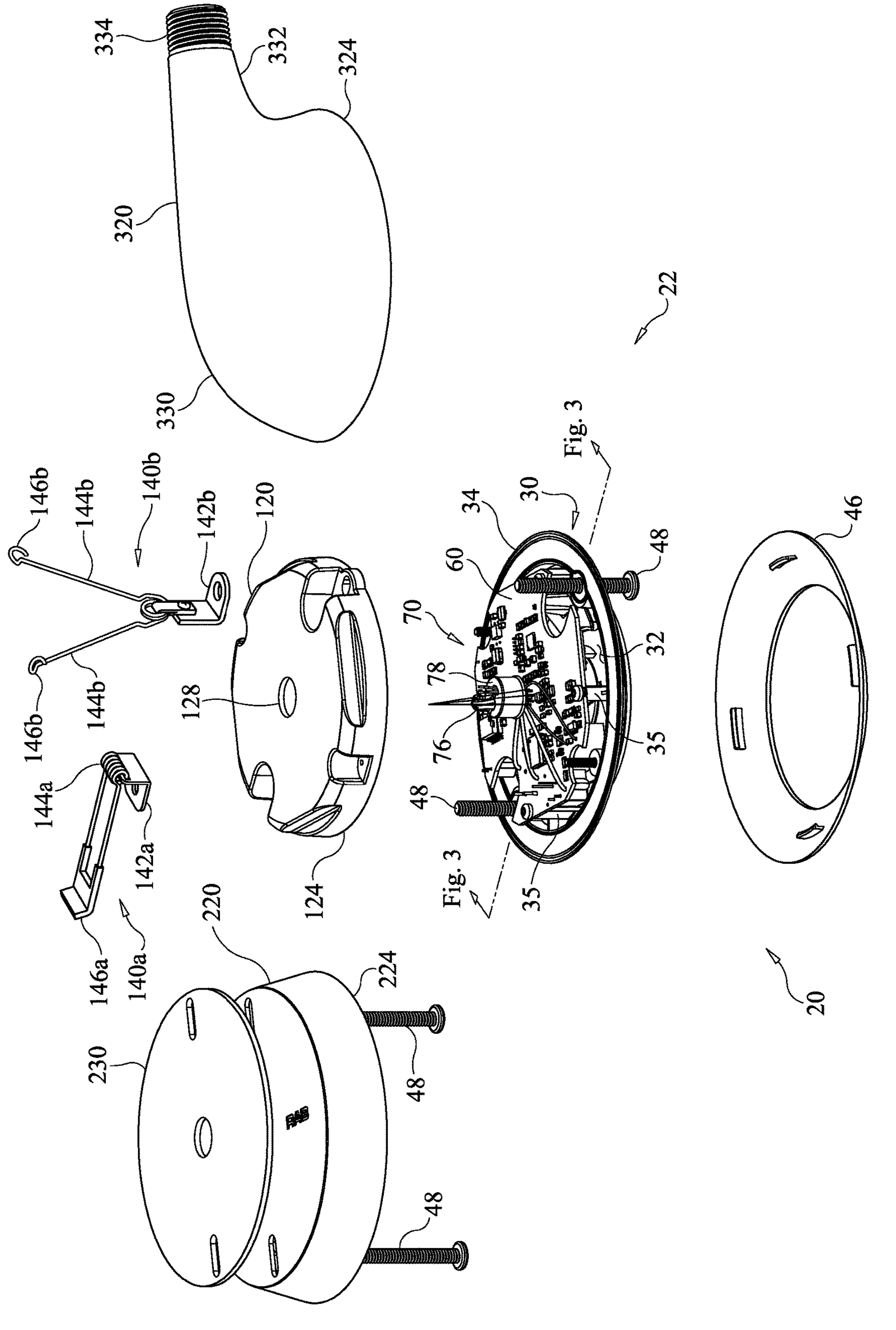
FIG. 2 is an exploded top perspective view of the lighting system device of FIG. 1.

The interior surface 32 of the lower housing 30 forms a cavity or space bounded by the upper edge 34. Advantageously, a portion of or all of the electronic devices 70 are located partially or fully in these bounds of the lower housing 30. For example, in the illustrative embodiment of FIG. 3, only a portion of some of the lower devices 74 mounted on the circuit board 60 extend within the lower housing 30. As shown in FIG. 2, standoffs 35 extending upward from the interior surface 32 of the lower housing 30 may used to support and fix the circuit board 60 to the lower housing.

FIG. 3 illustrates a side cross-sectional view of the illustrative modular lighting device 20 shown with all upper housings 120, 220, 320 overlappingly coupled with the lower housing 30. As can be understood from FIGS. 1-3, while more than one of the upper housings 120, 220 320 may be simultaneously coupled to the lower housing 30, for example, in nested fashion, not all of the upper housings may be simultaneously coupled to the lower housing 30 because of interference with one another. For example, in the illustrative embodiment, both of upper housings 120 and 220 may be coupled to the lower housing 30 simultaneously or both of upper housings 120 and 320 may be coupled to the lower housing simultaneously, but upper housings 220 and 320 would structurally interfere and may not be simultaneously coupled with the lower housing 30.

As shown in FIG. 3, in the illustrative embodiment, the circuit board 60 is supported by the lower housing 30, but the circuit board is located exclusively within a cavity or space bounded by the interior surface 122, 222, 322 and lower edge 124, 224, 324 of the respective upper housing(s) 120, 220, 320 that is/are selected to be coupled to the lower housing 30 for the desired installation mounting option. Additionally, the upper side devices 72 are also located exclusively within the upper housing(s) 120, 220, 320. In contrast, the lower side devices 74 are located at least partially within the upper housing(s) 120, 220, 320, and some devices 74 extend partially within the lower housing 30. In the illustrative embodiment of the modular lighting device, by maximizing the distribution of circuit board 60 and electronic devices 70 within the upper housing(s) 122, 222, 322 and minimizing the distribution within the lower housing 30, a low-profile height 36 is achieved for the lower housing 30, which is the portion of the modular lighting device 20 extending below the ceiling surface 10 for some installations. In alternative embodiments, a portion or all off the circuit board 60, the upper side devices 72, and the lower side devices 74 may be located exclusively within the upper housing 122, 222, 322 or exclusively within the lower housing 30.

Fasteners 48 may be used to couple, for example releasably couple, the lower housing 30 to one or more of the upper housings 122, 222, and 322, as shown in FIG. 3. In the illustrated embodiment, the outer surface 33 of the lower housing defines recesses 45 that are sized to receive fasteners 48.

An outer surface 33 of the lower housing may also define a central recess 38 (FIGS. 1 and 3), for example, for housing sensor optics 84 associated with the motion sensor 82, light guide 88*a* associated with light sensor 86*a*, and light guide 88*b* associated with light emitter 86*b*. Advantageously, a translucent or semi-translucent lens 42 may optionally cover the recess 38 and associated sensor optics 84 and light guides 88*a-b*. Additionally, an outer surface of the lens 42 may be flush with an annular rib 74 of the lower housing 30.

Advantageously, an annular cover 46 may be secured in place over a portion of the lower housing 30, including the recesses 45 and fasteners 48. For example, annular cover 46 and lower housing 30 may include cooperating features to allow annular cover 46 to be releasably snapped into place upon the lower housing 30. Additionally, as shown in cross-sectional view FIG. 3, the annular cover 46, annular rib 40, and lens 42 may be positioned and shaped to together form a uniform low-profile doomed surface to conceal the fasteners 48 and associated structure of the lower housing 30.

Figure 4:
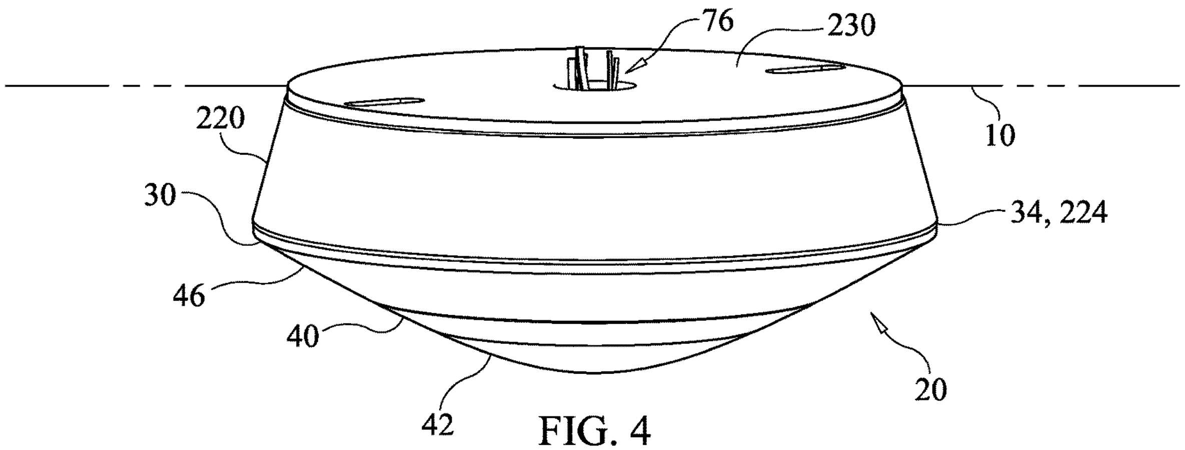
FIG. 4 is a perspective side view of the lighting system device of FIG. 1 shown with a first upper housing for flush mounting of the lighting system device.

Referring to FIG. 4, the modular lighting device 20 is illustrated installed entirely below and upon a ceiling surface 10. More specifically, the second upper housing 220 is selected to be coupled with the lower housing 30. Prior to coupling the housings 30 and 220 together, the second upper housing 220 can be mounted to the ceiling surface 10, for example, by using fasteners 48 as shown in FIG. 1. After the second upper housing 220 is mounted to the ceiling surface 10, the lower housing 30 can be coupled and secured to the second upper housing 220, for example, by using fasteners 48 shown in FIG. 1. After the annular ring 46 is coupled to the lower housing 30, concealing the fasteners 48, installation is complete. Optionally, installation gasket 230 can be located between the second upper housing 220 and the ceiling surface 10. The second upper housing 220 may include a bore 228 though which a power supply or other electrical connection can be coupled with electrical cable 76, which is electrically connected with the circuit board 60. A gasket 78 may optionally be included to seal or otherwise protect the electrical cable 76 within the bore 228.

As can be understood from cross-sectional view FIG. 3, the first upper housing 120 may optionally be sized to be enclosed within second upper housing 220, e.g., nested. This enables protection of the circuit board 60 and electrical devices 70 by enclosure by the upper housing 120 while second upper housing 220 is being mounted to the ceiling surface 10 and prior to the lower housing 30 being coupled to the second upper housing 220. This optional arrangement also protects the circuit board 60 and electrical devices 70 from an electrical connection between the electrical cable 76 and a power supply and/or other electrical connection. Optional retention of first upper housing 120 upon lower housing 30 is also available when selecting third upper housing 320 for installation, as discussed below.

Figure 5:
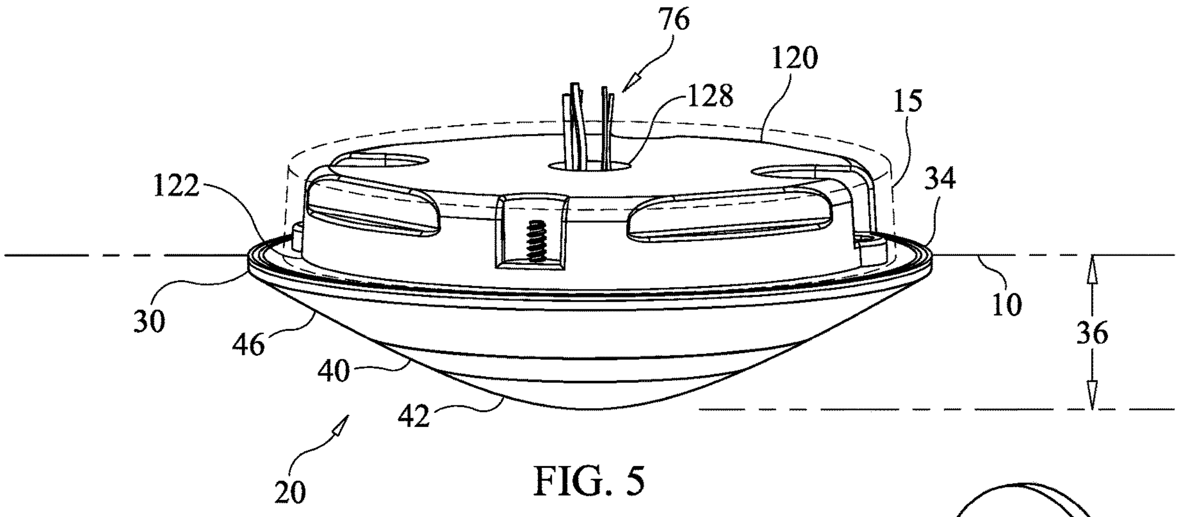
FIG. 5 is a perspective side view of the lighting system device of FIG. 1 shown with a second upper housing for electrical box mounting of the lighting system device.

Referring to FIG. 5, the modular lighting device 20 is illustrated installed with an electrical box 15 which is recessed within a ceiling surface 10. More specifically, the first upper housing 120 is selected to be coupled with the lower housing 30, the first upper housing 120 is located within the electrical box 15 upon installation, and the lower housing 30 is located below the ceiling surface 10 upon installation. The modular lighting device 20 can be mounted to the electrical junction box 15, for example, by using fasteners 48 as shown in FIG. 1. The upper housing 120 may include a bore 128 though which a power supply or other electrical connection available in the electrical box 15 can be made with electrical cable 76, which is electrically connected with the circuit board 60. A gasket 78 may optionally be included to seal or otherwise protect the electrical cable 76 within the bore 128. After the modular lighting device 20 is mounted to the ceiling surface 10, the annular ring 46 is coupled to the lower housing 30, concealing the fasteners 48.

Figure 6:
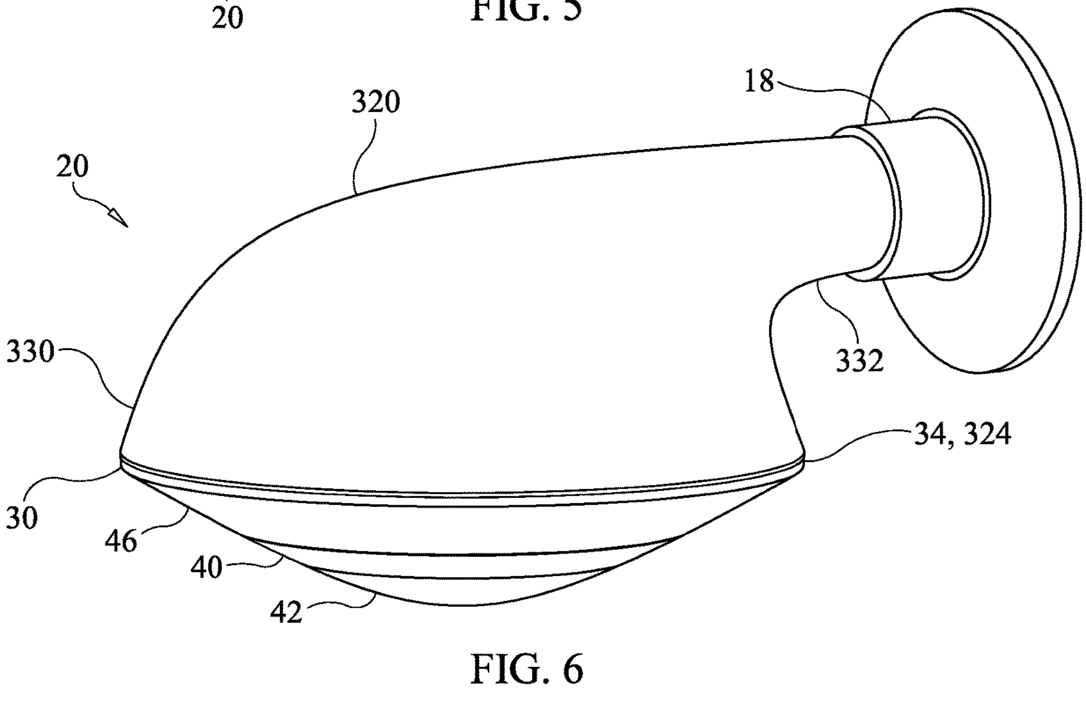
FIG. 6 is a perspective side view of the lighting system device of FIG. 1 shown with a third upper housing for conduit pipe mounting of the lighting system device.

Referring to FIG. 6, the modular lighting device 20 is illustrated installed to a conduit receptacle 18, for example, a threaded female connector (shown) or a bore in an electrical box (not shown). More specifically, the third upper housing 320 is selected to be coupled with the lower housing 30.

Prior to the coupling the housings 30 and 320 together, the third upper housing 320 can be mounted to the conduit receptacle 18. The third upper housing 320 includes a body 330, an arm 332, and a threaded conduit end 334 of the arm. The threaded conduit end 334 can be secured with the conduit receptacle 18 and a power supply or other electrical connection extending from the conduit receptacle end can be connected with the electrical cable 76 prior to the lower housing 30 being coupled to the third upper housing 320. After the third upper housing 320 is mounted to the conduit receptacle 18 and electrical connections completed, the lower housing 30 can be coupled and secured to the third upper housing 320, for example, by using fasteners 48 shown in FIG. 1. The body 330 of the third upper housing 320 can thereby enclose any required electrical connections to the electrical cable 76. After the annular ring 46 is coupled to the lower housing 30, concealing the fasteners 48, installation is complete.

Figure 7:
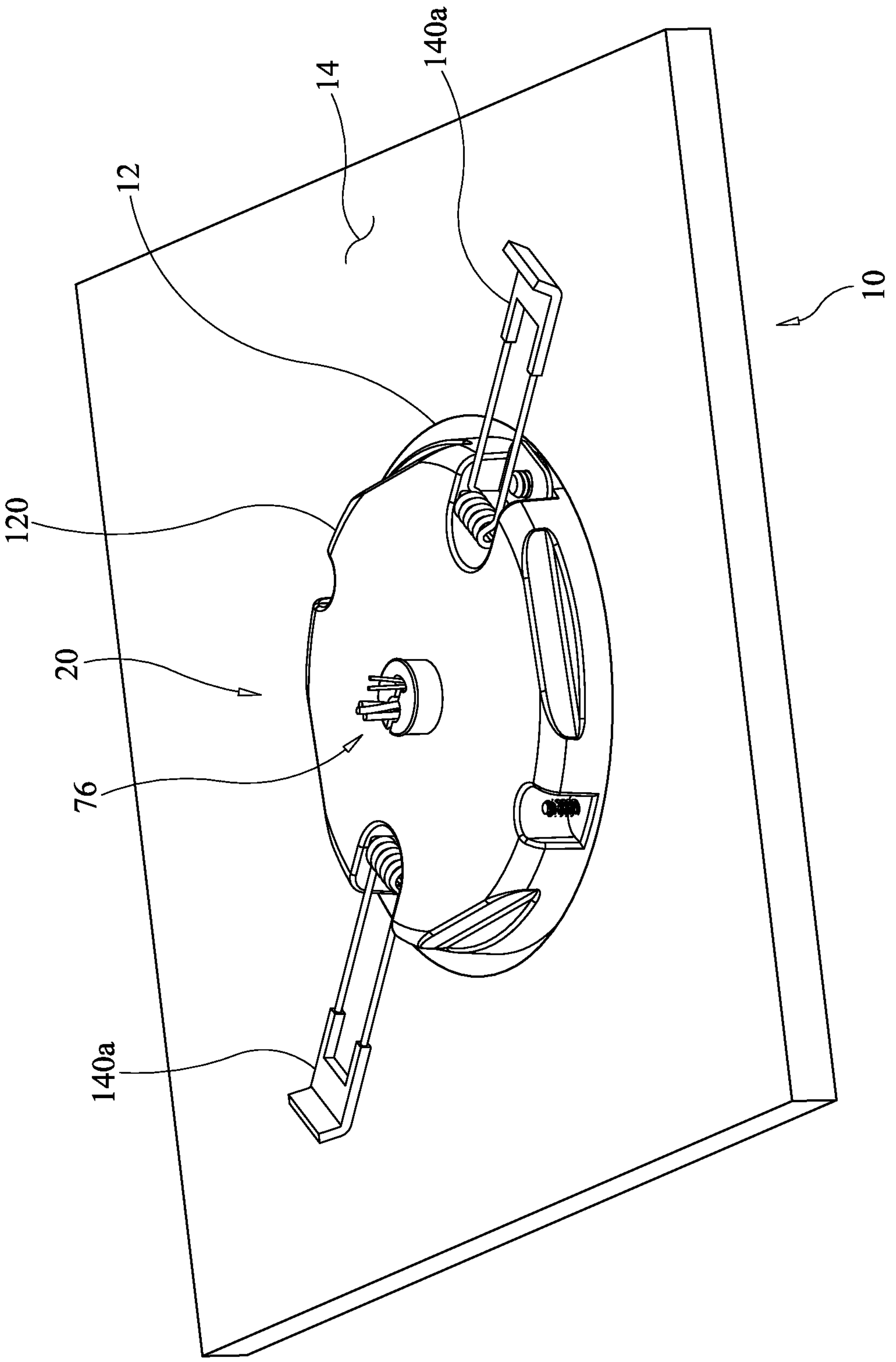
FIG. 7 is a perspective top view of the lighting system device of FIG. 1 shown with a fourth upper housing for recessed drywall mounting of the lighting system device.

Referring to FIG. 7, the modular lighting device 20 is illustrated installed within a recess 12 in a ceiling surface 10. More specifically, the upper housing 120 is selected to be coupled with the lower housing 30, and spring mounts **140*a* are coupled to the upper housing 120 and retain the modular lighting device 20 within the recess 12. After coupling the housings 30 and 120 together and prior to locating the upper housing 120 within the recess 12, a power supply or other electrical connection can be made with electrical cable 76 and the annular ring 46 is coupled to the lower housing 30, concealing the fasteners 48 that secure the lower housing 30 and spring mounts 140*a* to the upper housing 120**.

To mount the upper housing within the recess 12, the distal ends **146*a* are rotated upwardly about the spring 144*a* and anchor 142*a* and guided into and through the recess 12. Once the distal ends 146*a* and springs 144*a* of the spring mounts 140*a* are located above the upper ceiling surface 14, the distal ends 146*a* are spring-loaded by spring 144*a* to rotate the distal ends downwardly such that the distal ends pressing downwardly upon the upper ceiling surface 14 secure the upper edge 34 of the lower housing 30 against the lower ceiling surface 10, thereby concealing the recess 12 and upper housing 120 from view below the ceiling surface 10, for example, as illustrated in FIG. 5** for an alternate mounting option.

Figure 8:
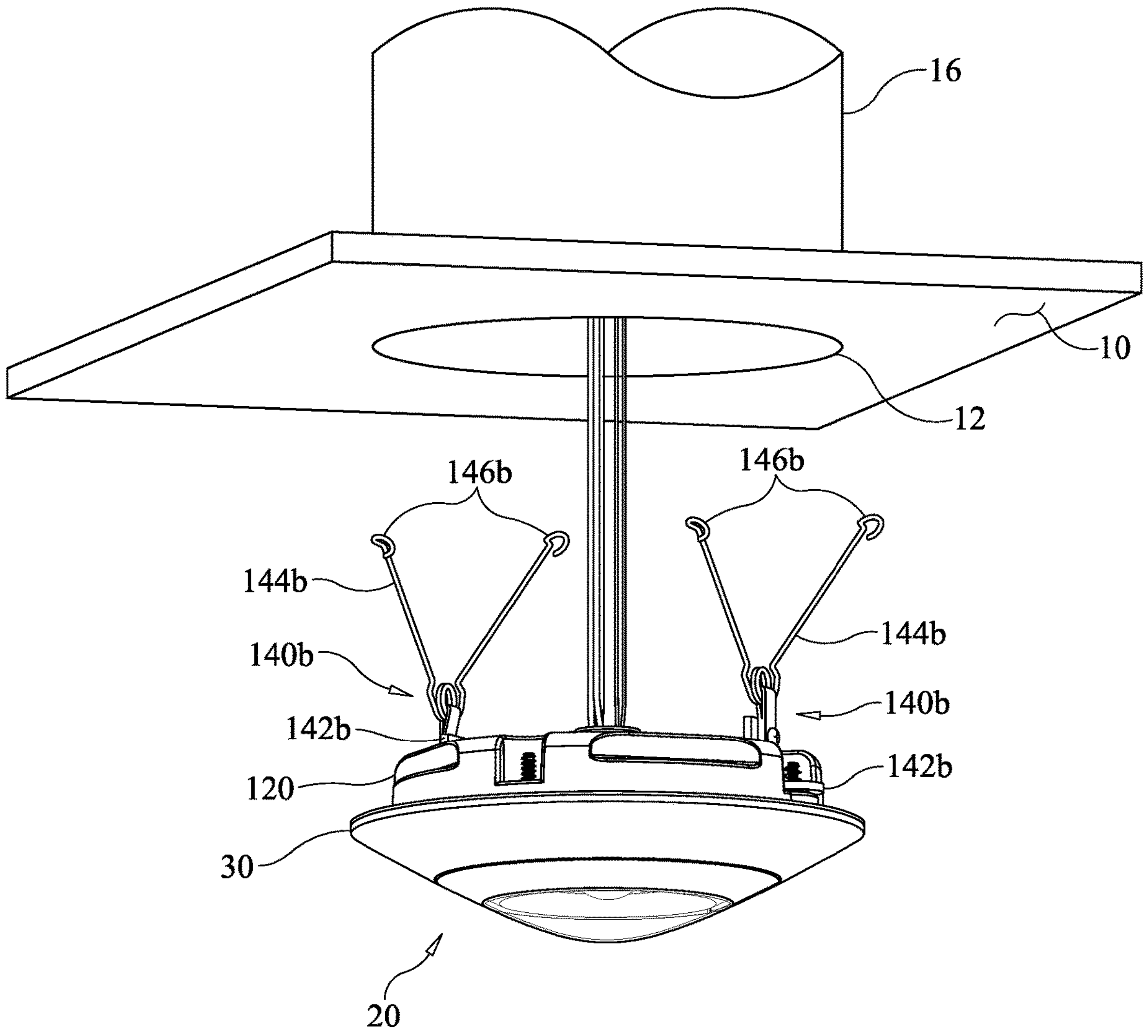
FIG. 8 is a perspective side view of the lighting system device show of FIG. 1 shown a fifth upper housing for recessed can mounting of the lighting system device.

Referring to FIG. 8, the modular lighting device 20 is illustrated installed within a recess 12 in a ceiling surface 10 that includes a recessed can 16 as is typically used for many recessed downlight installations. More specifically, the upper housing 120 is selected to be coupled with the lower housing 30, and spring mounts **140*b* are coupled to the upper housing 120 and retain the modular lighting device 20 within the recessed can 16. After coupling the housings 30 and 120 together and prior to locating the upper housing 120 within the recessed can 16, a power supply or other electrical connection can be made with electrical cable 76 and the annular ring 46 is coupled to the lower housing 30, concealing the fasteners 48 that secure the lower housing 30 and spring mounts 140*b* to the upper housing 120**.

To mount the upper housing within the recessed can 16, the distal ends **146*b* are rotated inwardly about the spring 144*b* and anchor 142*b* and guided into the recess 12 and recessed can 16. Once the distal ends 146*b* and springs 144*b* of the spring mounts 140*b* are located above the ceiling surface 10, the distal ends 146*b* are spring-loaded by spring 144*b* to rotate the distal ends outwardly such that the distal ends pressing against the recessed can 16 secure the modular lighting device vertically relative to the ceiling surface 10. The lower housing 30 can be pressed upwardly, extending the distal ends 146*b* of the spring mounts 140*b* deeper into the recessed can 16 until the upper edge 34 of the lower housing 30 contacts the lower ceiling surface 10, thereby concealing the recess 12, recessed can 16, and upper housing 120 from view below the ceiling surface 10, for example, as illustrated in FIG. 5** for an alternate mounting option.

Optionally, the third upper housing 320 is selected when the mounting surface is oriented vertically, and the first or second upper housings 120 and 220 are selected when the mounting surface is oriented horizontally.

Materials used to form lower housing 30 and upper housings 22 may be, for example but not limited to, plastic, including thermoplastics that are formed by molding, materials suitable for additive manufacturing, and sustainable materials, including but not limited to those that are formed by compression, molding, and additive manufacturing, for example, recycled paper pulp, natural textiles such as felt, and bio-plastics such as cellulose-based plastic.

In an alternative embodiment of the modular lighting device, the electrical devices 70 include an illumination source and the modular lighting device comprises a lighting fixture. In another alternative embodiment of the modular lighting device, the electrical devices 70 of include a wireless transceiver for communicating with user devices such as handheld computing devices or other connected devices, and may optionally provide access to a wide area network such as the internet and/or a local area network.

Reference systems that may be used herein can refer generally to various directions (e.g., upper, lower, forward and rearward), which are merely offered to assist the reader in understanding the various embodiments of the disclosure and are not to be interpreted as limiting.

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used or applied in combination with some or all of the features of other embodiments unless otherwise indicated. One or more exemplary embodiments have been shown and described, and all changes and modifications that come within the spirit of the disclosure are desired to be protected.

ELEMENT NUMBERING

Table 1 below includes element numbers and at least one word used to describe the member and/or feature represented by the element number. It is understood that none of the embodiments disclosed herein are limited to these descriptions, other words may be used in the description or claims to describe a similar member and/or feature, and these element numbers can be described by other words that would be understood by a person of ordinary skill reading and reviewing this disclosure in its entirety.

| | |
|---|---|
| 10 | ceiling surface |
| 12 | recess |
| 14 | upper ceiling surface |
| 15 | electrical box |
| 16 | recessed can |
| 18 | conduit receptacle |
| 20 | modular lighting device |
| 22 | upper housings |
| 30 | lower housing |
| 32 | interior |
| 33 | outer surface |
| 34 | upper edge |
| 35 | standoff |
| 36 | height |
| 38 | central recess |
| 40 | rib |
| 42 | lens |
| 44 | occlusion sticker |
| 45 | recess |
| 46 | annular cover |
| 48 | fasteners |
| 60 | circuit board |
| 70 | electronic devices |
| 72 | upper side devices |
| 74 | lower side devices |
| 76 | electrical cable |
| 78 | gasket |
| 80 | wireless transceiver |
| 82 | motion sensor |
| 84 | sensor optics |
| 86a | light sensor |
| 86b | light emitter |
| 88a | light guide |
| 88b | light guide |
| 90 | user interface |
| 120 | first upper housing |
| 122 | interior surface |
| 124 | lower edge |
| 126 | height |
| 128 | bore |
| 140a | spring mount |
| 142a | anchor |
| 144a | spring |
| 146a | distal end |
| 140b | spring mount |
| 142b | anchor |
| 144b | spring |
| 146b | distal end |
| 220 | second upper housing |
| 222 | interior surface |
| 224 | lower edge |
| 226 | height |
| 228 | bore |
| 230 | installation gasket |
| 320 | third upper housing |
| 322 | interior surface |
| 324 | lower edge |
| 326 | height |
| 330 | body |
| 332 | arm |
| 334 | threaded conduit end |

What is claimed is:

1. A modular lighting device, comprising:

a lower housing;

a circuit board supported by the lower housing and having electronic devices mounted thereto; and a plurality of upper housings each configured to releasably couple to the lower housing, a selected one of the plurality of upper housings coupled to the lower housing; and wherein:

the electronic devices of the circuit board extend within a lower space defined by an interior surface and upper edge of the lower housing and within an upper space defined by an interior surface and lower edge of each of the plurality of upper housings when coupled to the lower housing;

the lower space and the upper space are contiguous; and each of the plurality of upper housings provide a different mounting configuration for the modular lighting device.

2. The modular lighting device of claim 1, wherein the circuit board is located within the upper space defined by the interior surface and lower edge of the upper housing when coupled to the lower housing, thereby minimizing a height of the lower housing.

3. The modular lighting device of claim 1, wherein the electronic devices are mounted to an upper and a lower side of the circuit board.

4. The modular lighting device of claim 3, wherein the circuit board and electronic devices mounted thereto are enclosed by the lower housing and each of the plurality of upper housings when coupled to the lower housing.

5. The modular lighting device of claim 1, further comprising an annular cover releasably coupled with a bottom side of the lower housing, the annular cover spanning and concealing fasteners for at least one of mounting the modular lighting device and attaching the lower housing to one of the plurality of upper housings.

6. The modular lighting device of claim 1, wherein the selected one of the plurality of upper housings is configured to enable mounting within a recess defined in a ceiling.

7. The modular lighting device of claim 6, wherein:

the selected one of the plurality of upper housings is sized to be received within the recess; and the lower housing is sized to cover an area of the ceiling larger than the recess, thereby concealing the recess upon mounting the modular lighting device to the ceiling recess.

8. The modular lighting device of claim 6, wherein the selected one of the plurality of upper housings includes a pair of spring mounts for retaining the selected one of the plurality of upper housings within the recess.

9. The modular lighting device of claim 1, wherein the selected one of the plurality of upper housings is configured to enable mounting upon a flat surface of a ceiling.

10. The modular lighting device of claim 1, wherein the selected one of the plurality of upper housings includes a mounting arm terminating in a threaded conduit.

11. The modular lighting device of claim 1, wherein the electronic devices include a motion sensor.

12. The modular lighting device of claim 11, further comprising a lens coupled to a central portion of the lower housing, the lens concealing the motion sensor.

13. The modular lighting device of claim 11, wherein the electronic devices include a light sensor.

14. The modular lighting device of claim 1, wherein the electronic devices include a wireless transceiver for communication with a wireless lighting control system.

15. The modular lighting device of claim 1, wherein at least another one of the plurality of upper housings is sized to couple with the lower housing and enclose the selected one of the plurality of upper housings coupled to the lower housing.

16. A modular lighting device, comprising:

a lower housing;

a circuit board supported by the lower housing and having electronic devices mounted thereto; and a plurality of upper housings each configured to be coupled to the lower housing, a selected one of the plurality of upper housings coupled to the lower housing; and wherein:

the electronic devices of the circuit board span vertically from below an upper edge of the lower housing to above a lower edge of each of the plurality of upper housings when coupled to the lower housing, thereby the circuit board and electronic devices extend within a space defined by both the lower housing and each of the plurality of upper housings when coupled to the lower housing; and each of the plurality of upper housings provide a different mounting configuration for the modular lighting device.

17. The modular lighting device of claim 16, wherein:

the selected one of the plurality of upper housings is configured to enable mounting within a recess defined in a ceiling and is sized to be received within the recess; and the lower housing is sized to cover an area of the ceiling larger than the recess, thereby concealing the recess and the selected one of the plurality of upper housings upon mounting the modular lighting device to the ceiling recess.

18. The modular lighting device of claim 17, wherein the selected one of the plurality of upper housings includes a pair of spring mounts for retaining the one of the plurality of upper housings within the recess.

19. The modular lighting device of claim 16, wherein the selected one of the plurality of upper housings is configured to enable mounting the upper housing upon a flat surface of a ceiling.

20. The modular lighting device of claim 16, wherein the selected one of the plurality of upper housings includes a threaded conduit end.

21. The modular lighting device of claim 16, wherein the electronic devices of the circuit board include at least:

a motion sensor;

a light sensor;

a light emitter; and a wireless transceiver for communication with a wireless lighting control system.

22. A modular lighting device, comprising:

a lower housing;

a circuit board supported by the lower housing and having electronic devices mounted thereto; and a plurality of upper housings each configured to couple to the lower housing; and wherein:

the electronic devices of the circuit board extend within a lower space defined by an interior surface and upper edge of the lower housing and within an upper space defined by an interior surface and lower edge of each of the plurality of upper housings when coupled to the lower housing;

the lower space and the upper space are contiguous;

each of the plurality of upper housings provide a different mounting configuration for the modular lighting device;

a first one of the plurality of upper housings is sized to be received within a recess enabling an upper edge of the lower housing to be mounted against ceiling;

a second one of the plurality of upper housings is configured to enable mounting the upper housing upon a flat surface of a ceiling; and a third one of the plurality of upper housings includes a threaded conduit end.

* * * * *